US012809504B2

(12) United States Patent
Chan et al.

(10) Patent No.: US 12,809,504 B2
(45) Date of Patent: Nov. 24, 2026

(54) SYSTEM AND METHOD FOR INCREMENTAL LOADING WHEN RENDERING DESIGN INTERFACES IN A SIMULATION ENVIRONMENT

(71) Applicant: Figma, Inc., San Francisco, CA (US)

(72) Inventors: Andrew Chan, San Francisco, CA (US); Matthew Huang, San Francisco, CA (US); John Firebaugh, San Francisco, CA (US); Colton Pierson, San Francisco, CA (US); Daniel Furse, San Francisco, CA (US); Isaac Goldberg, San Francisco, CA (US)

(73) Assignee: FIGMA, INC.

( * ) Notice: Subject to any disclaimer, the term of this patent is extended or adjusted under 35 U.S.C. 154(b) by 177 days.

(21) Appl. No.: 18/436,975

(22) Filed: Feb. 8, 2024

(65) Prior Publication Data

US 2024/0272778 A1 Aug. 15, 2024

Related U.S. Application Data

(60) Provisional application No. 63/444,883, filed on Feb. 10, 2023.

(51) Int. Cl.
*G06F 3/04842* (2022.01)
*G06F 3/0481* (2022.01)

(52) U.S. Cl.
CPC ........ *G06F 3/04842* (2013.01); *G06F 3/0481* (2013.01)

(58) Field of Classification Search
CPC ........................... G06F 3/04842; G06F 3/0481
See application file for complete search history.

(56) References Cited

U.S. PATENT DOCUMENTS 5,978,841 A * 11/1999 Berger ................ G06F 16/9574 709/216
10,656,955 B1 * 5/2020 Nguyen ................ G06F 40/154
10,706,187 B1 * 7/2020 Ehrlund .................. G06F 30/20
2002/0124100 A1 * 9/2002 Adams .................. H04L 65/612 707/E17.12
2003/0169293 A1 * 9/2003 Savage ................. G06F 3/0481 715/762
2012/0233199 A1 * 9/2012 Jenkins ................. H04L 67/568 707/769
2012/0290959 A1 * 11/2012 Quine ..................... G06F 9/451 715/765
2013/0113750 A1 * 5/2013 Miyahara .............. G06F 3/0481 345/173
2014/0053057 A1 * 2/2014 Reshadi .............. G06F 16/9574 715/234

(Continued)

*Primary Examiner* — William L Bashore
*Assistant Examiner* — Gregory A Distefano
(74) *Attorney, Agent, or Firm* — Squire Patton Boggs LLP; Sarah Mirza

(57) ABSTRACT

A computing system implements a simulation environment for a graphic design system which creates a plurality of prototype screens that are individually renderable to simulate an application user interface. The computing system displays an initial prototype screen of the plurality of prototype screens, the initial prototype screen including a first set of interactive elements to navigate to a first set of prototype screens, and the computing system loads content associated with each prototype screen of the first set of prototype screens.

20 Claims, 10 Drawing Sheets

(56) References Cited

U.S. PATENT DOCUMENTS

| | | | | |
|---|---|---|---|---|
| 2016/0004515 | A1* | 1/2016 | Baeck | G06F 9/451 |
| | | | | 717/109 |
| 2019/0065017 | A1* | 2/2019 | Keller | G09B 5/02 |

* cited by examiner

SYSTEM AND METHOD FOR INCREMENTAL LOADING WHEN RENDERING DESIGN INTERFACES IN A SIMULATION ENVIRONMENT

RELATED APPLICATIONS

This application claims benefit of priority to provisional U.S. Patent Application No. 63/444,883, filed Feb. 10, 2023; the aforementioned priority application being incorporated by reference in its entirety for all purposes.

TECHNICAL FIELD

Examples described herein relate to a system and method for rendering design interfaces in a simulation environment.

BACKGROUND

Software design tools have many forms and applications. In the realm of application user interfaces, for example, a graphic design system is an example of a software design tool for enabling designers to implement functional user-interfaces for a production environment. A graphic design system can be used to enable designers to create a graphic design that blends functional aspects of a production-environment user-interface with aesthetics, developer requirements, and various other facets. A graphic design system can be used to generate a collection of screens which form a part of a production-environment user interface, which can be generated through execution of an application (e.g., mobile app).

DETAILED DESCRIPTION

Figure 1A:
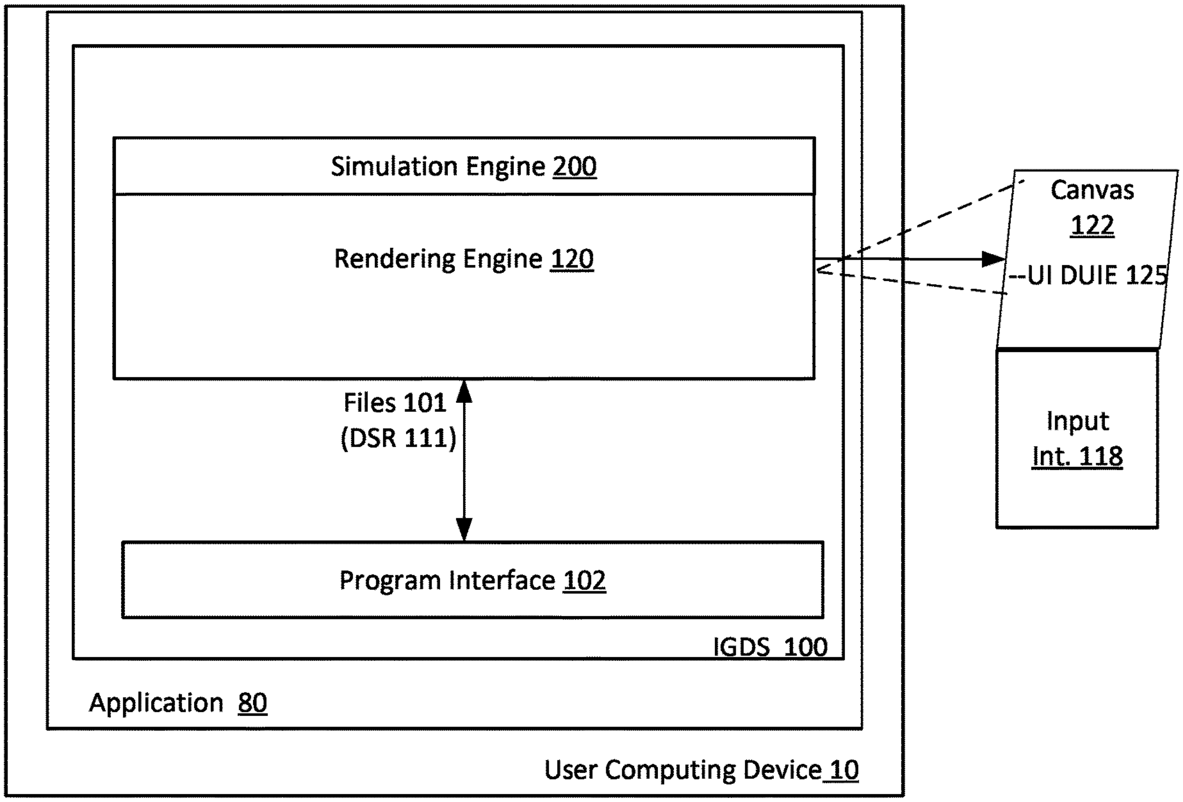
FIG. 1A illustrates an interactive graphic design system for a computing device of a user, according to one or more examples.

According to examples, a system provides an improved environment for enabling users to simulate implementation of a graphic design in a production environment.

A simulation environment that allows designers to collaboratively create and view production-environment renderings (or "prototypes") of designs in progress is a useful feature for an interactive graphic design system. However, prototype load times and stability become serious technical issues as prototypes multiply in size and scale and use increasingly complicated design systems with features like interactive components. Embodiments as described provide for configuring a graphic design system to implement a simulation environment that loads selectively loads, from a graphic design file, the content it needs at any given time ("incremental loading"), thereby significantly improving both load time and stability with regards to how the simulation environment is implemented. Achieving this while maintaining a reliable, smooth user experience at the scale involves solving several technical problems and augmenting the interactive graphic design system to allow for piecewise syncing of document content.

Under conventional approaches, a simulation environment, as implemented by a graphic design system, typically employs a simple loading strategy under which an entire document or file(s) for a graphic design is loaded into memory before any prototype (e.g., starting screen) is rendered in the simulation environment. However, as design elements and features are added to a graphic design file, the graphic design implementation file can becomes larger and larger, featuring multiple pages and design systems with greater numbers of design elements and component (with variants thereof). For example, designers can use pages to organize multiple user-interactive, production-environment flows into a single file. As demand for production-environment interactivity and functionality grows, the size of the graphic design file also grows, as does the need for simulation of the production environment to facilitate the designers in viewing and evaluating the increasing complex design aspects.

Additionally, in contrast to applications for individual users, a collaborative interactive graphic design system can have many users editing the same graphic design, resulting in corresponding graphic design files becoming larger than other types of design documents (e.g., webpages). This can result in prototypes which take excessively long periods of time to load. Excessive loading times for rendering prototypes in a production environment can detract and significantly diminish the value that would otherwise be provided through implementation of a production environment.

Another consideration is that mobile devices tend to have less memory than desktop devices, leading to large prototypes crashing on mobile when the simulation environment tries to load entire prototypes at once. In some instances, mobile phones and their operating systems kill the process instead of pulling in swap space to expand the application's virtual memory budget. Furthermore, large prototype files take longer to download over slower wireless internet connections and can consume data transfer allocations unnecessarily.

Accordingly, examples provide for an incremental loading strategy for use with prototyping a graphic design, in order to address issues present by conventional approaches. According to examples, a graphic design system implements a simulation environment in which the system downloads and stores in memory only the content that is needed to generate prototypes of a corresponding graphic design file. Further, in examples, any additional content needed can be loaded using a predictive pre-loading strategy as the user navigates the prototype.

According to embodiments, a graphic design system implements a simulation environment for a graphic design system which creates a plurality of prototype screens that are individually renderable to simulate an application user interface. The computing system displays an initial prototype screen of the plurality of prototype screens, the initial prototype screen including a first set of interactive elements to navigate to a first set of prototype screens, and the computing system loads content associated with each prototype screen of the first set of prototype screens.

As described with various examples, the graphic design system can receive user input corresponding to a selection of an interactive element of the first set of interactive elements, display a second prototype screen of the plurality of prototype screens, the second prototype screen including a second set of interactive elements to navigate to a second set of prototype screens, and load content associated with each prototype screen of the second set of prototype screens.

In some examples, the graphic design system evicts content associated with the initial prototype screen from memory.

In some examples, the graphic design system loads the content associated with each prototype screen of the first set of prototype screens includes traversing a document tree for the plurality of prototype screens.

In some examples, the graphic design system loads the content associated with each prototype screen of the first set of prototype screens includes traversing one or more separate component document trees for components that are embedded in each prototype screen.

In some examples, the graphic design system updates the content associated with one or more of the first set of prototype screens based on changes made by another user of the simulation environment.

In some examples, the graphic design system loads the content associated with each prototype screen of the first set of prototype screens in response to determining that memory storage capacity and/or processor power is determined to be insufficient to load the plurality of prototype screens in whole within a predetermined set of performance parameters.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs, or machines.

Furthermore, one or more aspects described herein may be implemented through the use of instructions that are executable by one or more processors. These instructions may be stored on a computer-readable medium. Machines shown or described with figures below provide examples of processing resources and computer-readable media on which instructions for implementing some aspects can be stored and/or executed. In particular, the numerous machines shown or described include processors and various forms of memory for storing data and instructions. Examples of computer-readable media include permanent memory storage devices, such as hard drives on personal computers or servers. Other examples of computer storage media include portable storage units, such as CD or DVD units, flash or solid-state memory (such as carried on many cell phones and consumer electronic devices), and magnetic memory. Computers, terminals, and network-enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions, and processing is performed by interconnected gates.

System Description

FIG. 1A illustrates an interactive graphic design system for a computing device of a user, according to one or more examples. An interactive graphic design system ("IGDS") 100 can be implemented in any one of multiple different computing environments. For example, in some variations, the IGDS 100 can be implemented as a client-side application that executes on the user computing device 10 to provide functionality as described with various examples. In other examples, such as described below, the IGDS 100 can be implemented through use of a web-based application 80. As an addition or alternative, the IGDS 100 can be implemented as a distributed system, such that processes described with various examples are executed on a network computer (e.g., server) and on the user device 10.

According to examples, the IGDS 100 can be implemented on a user computing device 10 to enable a corresponding user to design various types of interfaces using graphical elements. The IGDS 100 can include processes that execute as or through a web-based application 80 that is installed on the computing device 10. As described by various examples, web-based application 80 can execute scripts, code and/or other logic (the "programmatic components") to implement functionality of the IGDS 100. Additionally, in some variations, the IGDS 100 can be implemented as part of a network service, where web-based application 80 communicates with one or more remote computers (e.g., server used for a network service) to executes processes of the IGDS 100.

In some examples, web-based application 80 retrieves some or all of the programmatic resources for implementing the IGDS 100 from a network site. As an addition or alternative, web-based application 80 can retrieve some or all of the programmatic resources from a local source (e.g., local memory residing with the computing device 10). The web-based application 80 may also access various types of data sets in providing the IGDS 100. The data sets can correspond to files and libraries, which can be stored remotely (e.g., on a server, in association with an account) or locally.

In examples, the web-based application 80 can correspond to a commercially available browser, such as GOOGLE CHROME (developed by GOOGLE, INC.), SAFARI (developed by APPLE, INC.), and INTERNET EXPLORER (developed by the MICROSOFT CORPORA- TION). In such examples, the processes of the IGDS 100 can be implemented as scripts and/or other embedded code which web-based application 80 downloads from a network site. For example, the web-based application 80 can execute code that is embedded within a webpage to implement processes of the IGDS 100. The web-based application 80 can also execute the scripts to retrieve other scripts and programmatic resources (e.g., libraries) from the network site and/or other local or remote locations. By way of example, the web-based application 80 may execute JAVASCRIPT embedded in an HTML resource (e.g., webpage structured in accordance with HTML 5.0 or other versions, as provided under standards published by W3C or WHATWG consortiums). In some examples, the rendering engine 120 and/or other components may utilize graphics processing unit (GPU) accelerated logic, such as provided through WebGL (Web Graphics Library) programs which execute Graphics Library Shader Language (GLSL) programs that execute on GPUs.

According to examples, user of computing device 10 operates web-based application 80 to access a network site, where programmatic resources are retrieved and executed to implement the IGDS 100. In this way, the user may initiate a session to implement the IGDS 100 for the purpose of creating and/or editing a design interface. In examples, the IGDS 100 includes a program interface 102, an input interface 118, and a rendering engine 120. The program interface 102 can include one or more processes which execute to access and retrieve programmatic resources from local and/or remote sources.

In an implementation, the program interface 102 can generate, for example, a canvas 122, using programmatic resources which are associated with web-based application 80 (e.g., HTML 5.0 canvas). As an addition or variation, the program interface 102 can trigger or otherwise cause the canvas 122 to be generated using programmatic resources and data sets (e.g., canvas parameters) which are retrieved from local (e.g., memory) or remote sources (e.g., from network service).

The program interface 102 may also retrieve programmatic resources that include an application framework for use with canvas 122. The application framework can include data sets which define or configure, for example, a set of interactive graphic tools that integrate with the canvas 122 and which comprise the input interface 118, to enable the user to provide input for creating and/or editing a design interface.

According to some examples, the input interface 118 can be implemented as a functional layer that is integrated with the canvas 122 to detect and interpret user input. The input interface 118 can, for example, use a reference of the canvas 122 to identify a screen location of a user input (e.g., 'click'). Additionally, the input interface 118 can interpret an input action of the user based on the location of the detected input (e.g., whether the position of the input indicates selection of a tool, an object rendered on the canvas, or region of the canvas), the frequency of the detected input in a given time period (e.g., double-click), and/or the start and end position of an input or series of inputs (e.g., start and end position of a click and drag), as well as various other input types which the user can specify (e.g., right-click, screen-tap, etc.) through one or more input devices. In this manner, the input interface 118 can interpret, for example, a series of inputs as a design tool selection (e.g., shape selection based on location of input), as well as inputs to define attributes (e.g., dimensions) of a selected shape.

Additionally, the program interface 102 can be used to retrieve, from local or remote sources, programmatic resources and data sets which include files 101 which comprise an active workspace for the user. In examples, the files 101 can be structured to define or otherwise include a collection of cards, where the cards of the collection provide the design elements for a user interface or presentation when rendered in a production-environment. In examples, the individual cards can represent, for example, an application screen or a state of an application. The retrieved data sets can include one or more cards that include design elements which collectively form a design interface, or a design interface that is in progress. Each file 101 can include one or multiple data structure representations 111 which collectively define the design interface. The files 101 may also include additional data sets which are associated with the active workspace. For example, as described with some examples, the workspace file can store animation data sets which define animation behavior as between objects or states in renderings of the canvas 122.

In examples, the rendering engine 120 uses the data structure representations 111 to render a corresponding DIUE 125 on the canvas 122, wherein the DIUE 125 reflects graphic elements and their respective attributes as provided with the individual pages of the files 101. The user can edit the DIUE 125 using the input interface 118. Alternatively, the rendering engine 120 can generate a blank page for the canvas 122, and the user can use the input interface 118 to generate the DIUE 125. As rendered, the DIUE 125 can include graphic elements such as a background and/or a set of objects (e.g., shapes, text, images, programmatic elements), as well as attributes of the individual graphic elements. Each attribute of a graphic element can include an attribute type and an attribute value. For an object, the types of attributes include, shape, dimension (or size), layer, type, color, line thickness, text size, text color, font, and/or other visual characteristics. Depending on implementation, the attributes reflect properties of two- or three-dimensional designs. In this way, attribute values of individual objects can define, for example, visual characteristics of size, color, positioning, layering, and content, for elements that are rendered as part of the DIUE 125.

Network Computing System to Implement IGDS

Figure 1B:
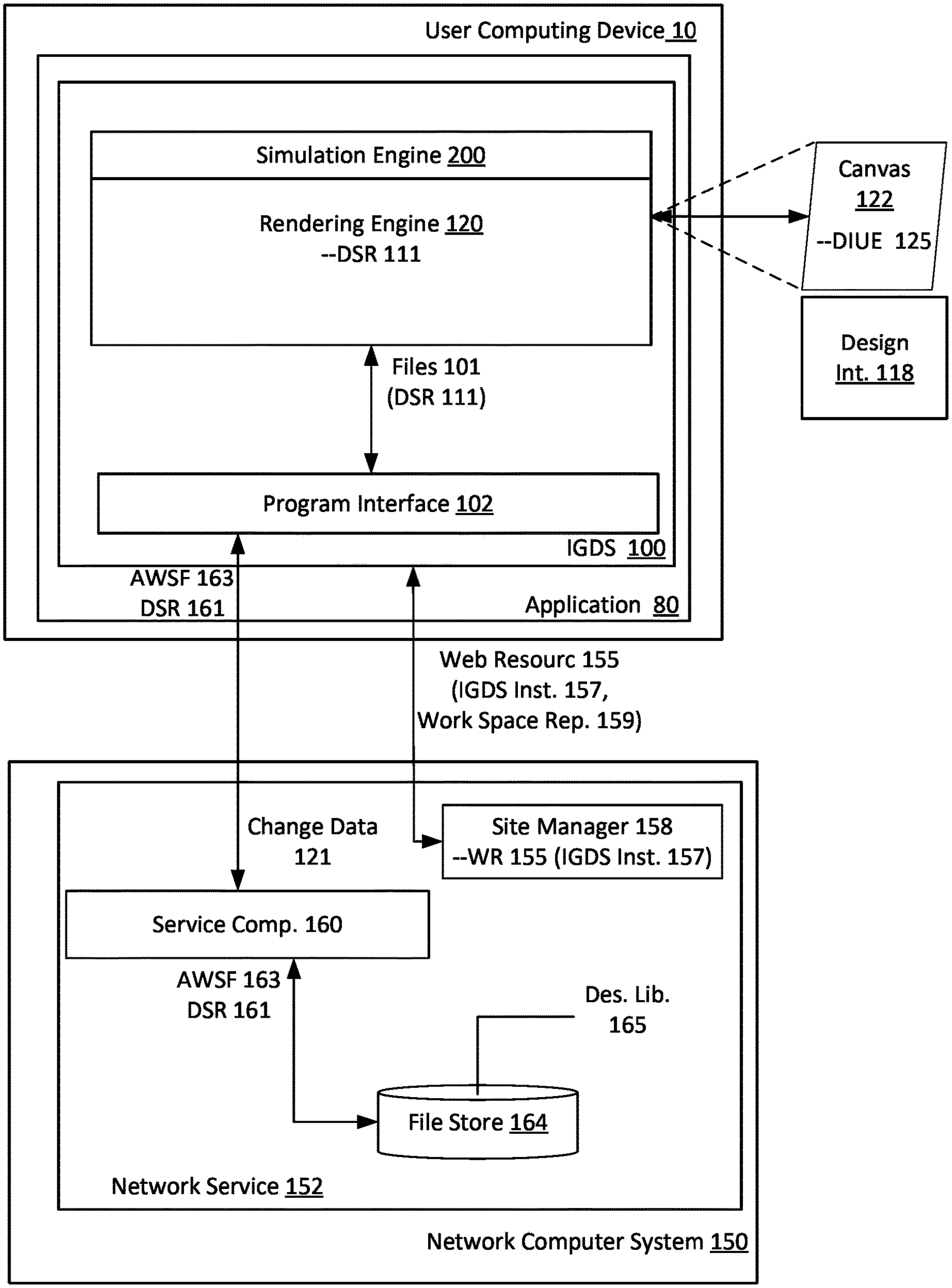
FIG. 1B illustrates a network computing system to implement an interactive graphic design system on a user computing device, according to one or more examples.

FIG. 1B illustrates a network computing system to implement an interactive graphic design system on a user computing device, according to one or more examples. A network computing system such as described with an example of FIG. 1B can be implemented using one or more servers which communicate with user computing devices over one or more networks.

In an example of FIG. 1B, the network computing system 150 perform operations to enable the IGDS 100 to be implemented on the user computing device 10. In variations, the network computing system 150 provides a network service 152 to support the use of the IGDS 100 by user computing devices that utilize browsers or other web-based applications. The network computing system 150 can include a site manager 158 to manage a website where a set of web-resources 155 (e.g., web page) are made available for site visitors. The web-resources 155 can include instructions, such as scripts or other logic ("IGDS instructions 157"), which are executable by browsers or web components of user computing devices.

In some variations, once the computing device 10 accesses and downloads the web-resources 155, web-based application 80 executes the IGDS instructions 157 to implement functionality such as described with some examples of FIG. 1A. For example, the IGDS instructions 157 can be executed by web-based application 80 to initiate the program interface 102 on the user computing device 10. The initiation of the program interface 102 may coincide with the establishment of, for example, a web-socket connection between the program interface 102 and a service component 160 of the network computing system 150.

In some examples, the web-resources 155 includes logic which web-based application 80 executes to initiate one or more processes of the program interface 102, causing the IGDS 100 to retrieve additional programmatic resources and data sets for implementing functionality as described by examples. The web resources 155 can, for example, embed logic (e.g., JAVASCRIPT code), including GPU accelerated logic, in an HTLM page for download by computing devices of users. The program interface 102 can be triggered to retrieve additional programmatic resources and data sets from, for example, the network service 152, and/or from local resources of the computing device 10, in order to implement the IGDS 100. For example, some of the components of the IGDS 100 can be implemented through webpages that can be downloaded onto the computing device 10 after authentication is performed, and/or once the user performs additional actions (e.g., download one or more pages of the workspace associated with the account identifier). Accordingly, in examples as described, the network computing system 150 can communicate the IGDS instructions 157 to the computing device 10 through a combination of network communications, including through downloading activity of web-based application 80, where the IGDS instructions 157 are received and executed by web-based application 80.

The computing device 10 can use web-based application 80 to access a website of the network service 152 to download the webpage or web resource. Upon accessing the website, web-based application 80 can automatically (e.g., through saved credentials) or through manual input, communicate an account identifier to the service component 160. In some examples, web-based application 80 can also communicate one or more additional identifiers that correlate to a user identifier.

Additionally, in some examples, the service component 160 can use the user or account identifier of the user identifier to retrieve profile information 109 from a user profile store 166. As an addition or variation, profile information 109 for the user can be determined and stored locally on the user's computing device 10.

The service component 160 can also retrieve the files of an active workspace ("active workspace files 163") that are linked to the user account or identifier from a file store 164. The profile store 166 can also identify the workspace that is identified with the account and/or user, and the file store 164 can store the data sets that comprise the workspace. The data sets stored with the file store 164 can include, for example, the pages of a workspace, data sets that identify constraints for an active set of workspace files, and one or more data structure representations 161 for the design under edit which is renderable from the respective active workspace files.

Additionally, in examples, the service component 160 provides a representation 159 of the workspace associated with the user to the web-based application 80, where the representation identifies, for examples, individual files associated with the user and/or user account. The workspace representation 159 can also identify a set of files, where each file includes one or multiple pages, and each page including objects that are part of a design interface.

On the user device 10, the user can view the workspace representation through web-based application 80, and the user can elect to open a file of the workspace through web-based application 80. In examples, upon the user electing to open one of the active workspace files 163, web-based application 80 initiates the canvas 122. For example, the IGDS 100 can initiate an HTML 5.0 canvas as a component of web-based application 80, and the rendering engine 120 can access one or more data structures representations 111 of a design interface under edit (DIUE) 125, to render the corresponding DIUE 125 on the canvas 122.

The service component 160 may also determine, based on the user credentials, a permission setting or role of the user in connection with the account identifier. The permission settings or role of the user can determine, for example, the files which can be accessed by the user. In some examples, the implementation of the rendering engine 120 on the computing device 10 can be configured based at least in part on the role or setting of the user. For example, the user's ability to specify constraints for the DIUE 125 can be determined by the user's permission settings, where the user can be enabled or precluded from creating constraints 145 for the DIUE 125 based on their respective permission settings. Still further, in some variations, the response action which the user can take to resolve a conflict can be limited by the permission setting of the user. For example, the ability of the user to ignore constraints 145 can be based on the permission setting of the user.

In examples, the changes implemented by the rendering engine 120 to the DIUE 125 can also be recorded with the respective data structure representations 111, as stored on the computing device 10. The program interface 102 can repeatedly, or continuously stream change data 121 to the service component 160, wherein the updates reflect edits as they are made to the DIUE 125 and to the data structure representation 111 to reflect changes made by the user to the DIUE 125 and to the local data structure representations 111 of the DIUE 125. The service component 160 can receive the change data 121, which in turn can be used to implement changes to the network-side data structure representations 161. In this way, the network-side data structure representations 161 for the active workspace files 163 can mirror (or be synchronized with) the local data structure representations 111 on the user computing device 10. When the rendering engine 120 implements changes to the DIUE 125 on the user device 10, the changes can be recorded or otherwise implemented with the local data structure representations 111, and the program interface 102 can stream the changes as change data 121 to the service component 160 in order to synchronize the local and network-side representations 111, 161 of the DIUE 125. This process can be performed repeatedly or continuously, so that the local and network-side representations 111, 161 of the DIUE 125 remain synchronized.

Collaborative Network Platform

Figure 1C:
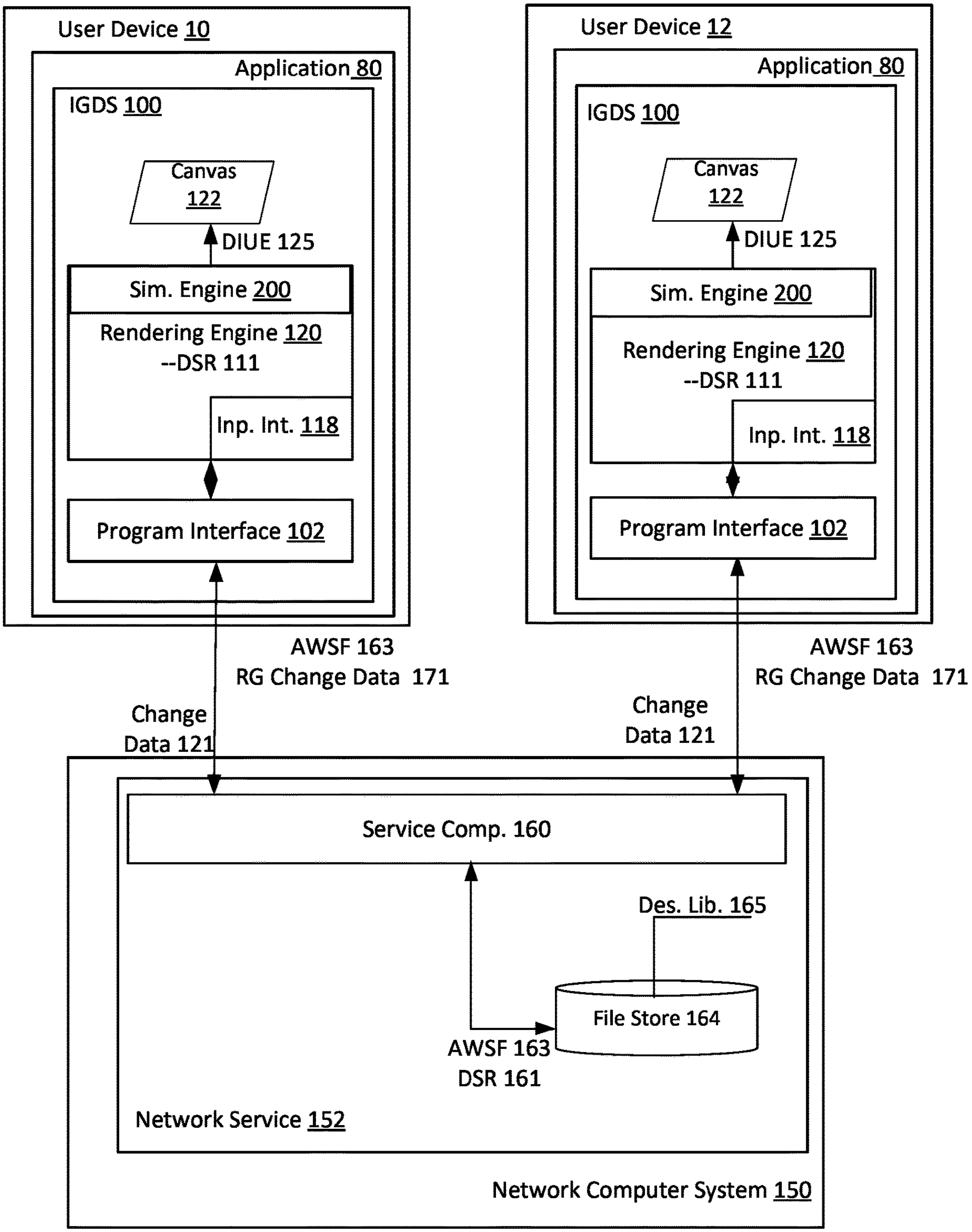
FIG. 1C illustrates a network computing system to implement an interactive graphic design system for multiple users in a collaborative network platform, according to one or more examples.

FIG. 1C illustrates a network computing system to implement an interactive graphic design system for multiple users in a collaborative network platform, according to one or more examples. In an example of FIG. 1C, a collaborative network platform is implemented by the network computing system 150, which communicates with multiple user computing devices 10, 12 over one or more networks (e.g., World Wide Web) to implement the IGDS 100 on each computing device. While FIG. 1C illustrates an example in which two users utilize the collaborative network platform, examples as described allow for the network computing system 150 to enable collaboration on design interfaces amongst a larger group of users.

With respect to FIG. 1C, the user computing devices 10, 12 can be assumed as being operated by users that are associated with a common account, with each user computing device 10, 12 implementing a corresponding IGDS 100 to access the same workspace during respective sessions that overlap with one another. Accordingly, each of the user computing devices 10, 12 may access the same set of active workspace files 163 at the same time, with the respective program interface 102 of the IGDS 100 on each user computing device 10, 12 operating to establish a corresponding communication channel (e.g., web socket connection) with the service component 160.

In examples, the service component 160 can communicate a copy of the active workspace files 163 to each user computing device 10, 12, such that the computing devices 10, 12 render the DIUE 125 of the active workspace files 163 at the same time. Additionally, each of the computing devices 10, 12 can maintain a local data structure representation 111 of the respective DIUE 125, as determined from the active workspace files 163. The service component 160 can also maintain a network-side data structure representation 161 obtained from the files of the active workspace 163, and coinciding with the local data structure representations 111 on each of the computing devices 10, 12.

The network computing system 150 can continuously synchronize the active workspace files 163 on each of the user computing devices. In particular, changes made by users to the DIUE 125 on one computing device 10, 12 may be immediately reflected on the DIUE 125 rendered on the other user computing device 10, 12. By way of example, the user of computing devices 10 can make a change to the respective DIUE 125, and the respective rendering engine 120 can implement an update that is reflected in the local copy of the data structure representation 111. From the computing device 10, the program interface 102 of the IGDS 100 can stream change data 121, reflecting the change of the user input, to the service component 160. The service component 160 processes the change data 121 of the user computing device. The service component 160 can use the change data 121 to make a corresponding change to the network-side data structure representation 161. The service component 160 can also stream remotely-generated change data 171 (which in the example provided, corresponds or reflects change data 121 received from the user device 10) to the computing device 12, to cause the corresponding IGDS 100 to update the DIUE 125 as rendered on that device. The computing device 12 may also use the remotely generated change data 171 to update with the local data structure representation 111 of that computing device 12. The program interface 102 of the computing device 12 can receive the update from the network computing system 150, and the rendering engine 120 can update the DIUE 125 and the respective local copy of 111 of the computing device 12.

The reverse process can also be implemented to update the data structure representations 161 of the network computing system 150 using change data 121 communicated from the second computing device 12 (e.g., corresponding to the user of the second computing device updating the DIUE 125 as rendered on the second computing device 12). In turn, the network computing system 150 can stream remotely generated change data 171 (which in the example provided, corresponds or reflects change data 121 received from the user device 12) to update the local data structure representation 111 of the DIUE 125 on the first computing device 10. In this way, the DIUE 125 of the first computing device 10 can be updated as a response to the user of the second computing device 12 providing user input to change the DIUE 125.

To facilitate the synchronization of the data structure representations 111, 111 on the computing devices 10, 12, the network computing system 150 may implement a stream connector to merge the data streams which are exchanged between the first computing device 10 and the network computing system 150, and between the second computing device 12 and the network computing system 150. In some implementations, the stream connector can be implemented to enable each computing device 10, 12 to make changes to the network-side data representation 161, without added data replication that may otherwise be required to process the streams from each device separately.

Additionally, over time, one or both of the computing devices 10, 12 may become out-of-sync with the server-side data representation 161. In such cases, the respective computing device 10, 12 can redownload the active workspace files 163, to restart the maintenance of the data structure representation of the DIUE 125 that is rendered and edited on that device.

Simulation Engine

With reference to FIG. 1A through FIG. 1C, in examples, the IGDS 100 can implement a simulation engine 200 for users. In some examples, the simulation engine 200 can implement alternative modes, including a design mode and a simulation mode. In simulation mode, the simulation engine 200 generates simulation renderings for individual cards of a collection. The simulation engine 200 can render a sequence of cards in order to provide users with a production-environment simulation of a design interface that is in progress or under edit. In examples, the simulation engine 200 can be implemented as part of the rendering engine 120. In variations, the simulation engine 200 can be implemented through another component. Still further, the simulation engine 200 can be provided as a separate system that can integrate or operate with the IGDS 100.

As described with examples, the simulation engine 200 can implement processes to efficiently generate a simulation rendering, where stateful design elements are interactive and/or dynamic, so that the stateful design elements change states responsive to user input or other events when the simulation renderings are generated. Among other benefits, examples enable such simulation renderings to render stateful design elements in a manner that is interactive and/or dynamic, to accurately replicate a production-environment for the simulated design. When stateful design elements are rendered with a simulated rendering of a card, the state of the design element may change (e.g., responsive to user input). For example, the stateful design element can correspond to a video element, which when played back, undergoes state change (e.g., playback time). In examples, the simulation engine 200 renders multiple cards where a state of the rendered stateful element is progressed from card to card, to more accurately simulate how the stateful element would be rendered in a production-environment.

Simulation Engine

Figure 2:
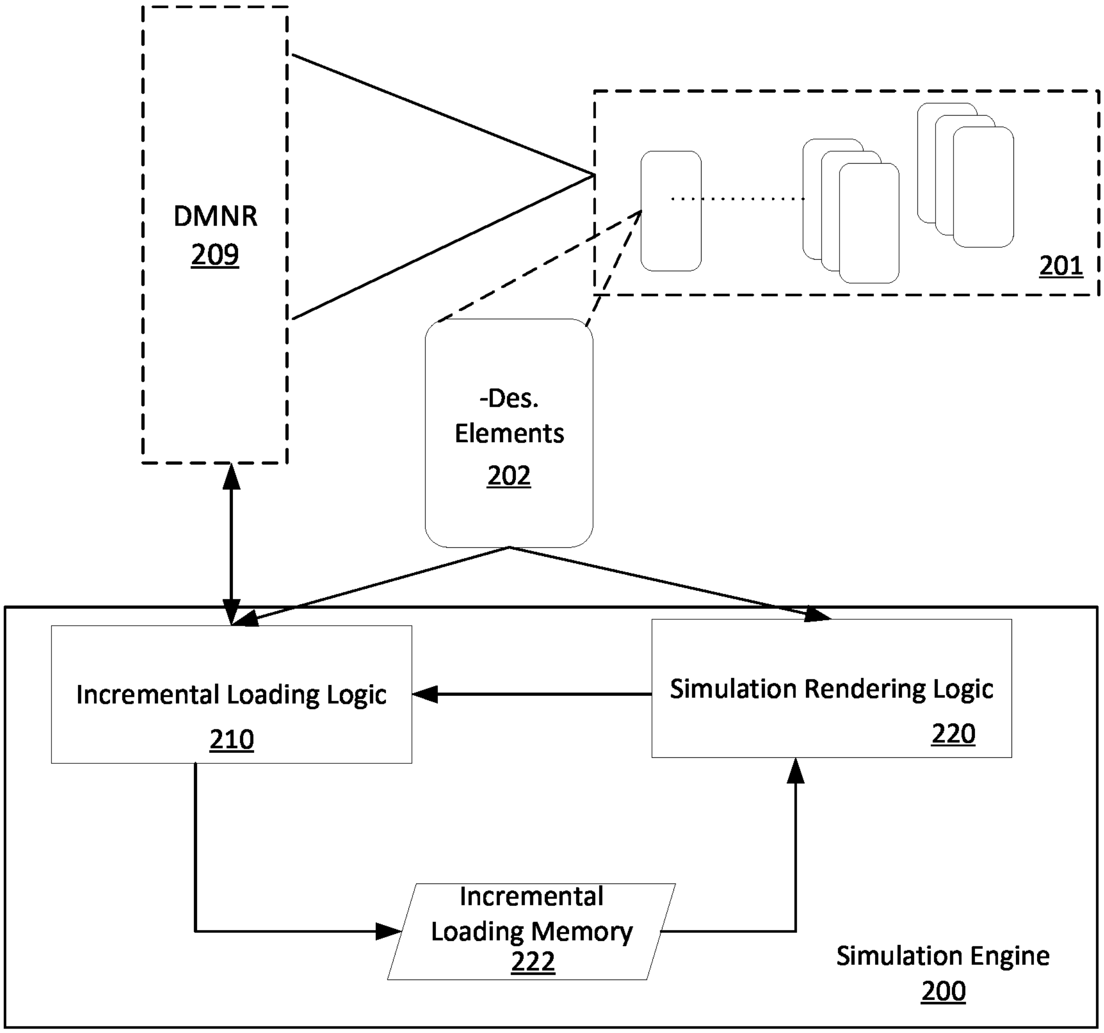
FIG. 2 illustrates a simulation engine, in accordance with one or more embodiments.

FIG. 2 illustrates a simulation engine, in accordance with one or more embodiments. The simulation engine 200 can be implemented or otherwise provided with the IGDS 100 in order to enable users to simulate how a sequence of cards would be rendered in the production-environment ("production-environment rendering" or "simulation rendering"), where each card includes a top-level frame that contains a set of design elements. Accordingly, the simulation engine 200 can generate production-environment renderings as an output, often utilizing multiple cards 200 to of a collection 201, where design elements of each card 202 combine to simulate a set of production elements for a user interface or presentation in the production-environment.

In some examples, a simulation engine 200 can be implemented as part of the rendering engine 120 for the IGDS 100. For example, the IGDS 100 can implement alternative modes, including a design mode and a simulation mode, where in the simulation mode, the rendering engine 120 executes processes of simulation engine 200 to render production-environment renderings as an output, where the production-environment renderings simulate a design interface when it is in production.

Logical Hierarchical Representation of Cards

As described with examples, the IGDS 100 enables a user to interact with a canvas to create design elements, where design elements can have spatial and logical relationships one another. Design elements can be linked, for example, as having parent/child relationship, or alternatively referred to as nested design elements. In examples, nested design elements can have a spatial and logical relationship with one another. For example, a design element can be nested within another design element, meaning a boundary or frame of the design element (e.g., child element) is contained within the boundary or frame of the other design element (e.g., parent element). Further, nested design elements can be logically linked, such as in a manner where design input to either design element can trigger rules or other logic that affect the other design element. The rules or logic that affect nested design elements can serve to maintain the design elements in their spatial relationship, such that one node remains the parent of the other (or one node remains the child of the other) despite, for example, resize or reposition input that would otherwise affect the parent-child spatial relationship. Thus, for example, nested design elements can be subject to a common set of constraints, as well as other functional features (e.g., auto-layout). Still further, as another example, the design input to move one of the design elements of a nested pair can result in the other design element being moved or resized.

Further, the IGDS 100 enables users to specify flows that specify sequences (including alternative sequences) amongst multiple cards. For example, a user can specify logical connections amongst a collection 201 of cards 202, where the logical connections specify a sequence. As individual cards 202 may specify, for example, alternative states of same screen or interface, the use of such logical connectors can specify state changes or flows of the user interface or presentation when in production, where the state changes or flows are responsive to events (e.g., user input) which may occur in such production-environment. The IGDS 100 can determine and utilize a common hierarchical logical data structure ("design-mode nodal representation 209") to represent a collection of cards. In some aspects, a document object model (DOM) can be maintained for the collection of cards 201, where the DOM includes a hierarchical arrangement of nodes. Each object has an identifier and a collection of properties with values. For example, the document can be represented as a two-level map: Map<ObjectID, Map<Property, Value>> or as a database with rows that store (ObjectID, Property, Value) tuples.

Each card 202 of the collection can be represented by a corresponding root node (Level 0, or top-most-level node), and each design element can be represented as a sub-node of the root node. Within each root node, sub-nodes can be arranged to have different levels. A top-most sub-node of the root node (i.e., Level 1 node) can include design elements of the card 202 that are not children of any other design elements except for the top-level frame represented by the root node. In turn, any child design element to one of the design elements represented by a top-level sub-node (Level 1) can be represented by a second level sub-node (i.e., Level 2 node) and so forth. The design-mode nodal representation 209 can be determined for each card 202, and further combined for all of the cards of the collection 201. The design-mode nodal representation 209 of the collection 201 can be provided by the IGDS 100 as, for example, part of a separate panel in a tool panel of the IGDS 100.

Simulation Rendering Logic

In examples, the simulation engine 200 includes processes represented by incremental loading logic 210 and simulation rendering logic 220. The simulation rendering logic 220 generates a production-environment rendering from each card 202 that is processed by the simulation engine 200, where the production-environment rendering includes production elements of a simulated user interface or presentation. Further, the production-environment renderings can be interactive or dynamically responsive to events, such as responsive to user input that simulates an end user input in the production-environment. Upon generating an initial production-environment rendering for a card that is initially selected, the simulation rendering logic 220 generates a next production-rendering from a card 202 that is the next selection from the collection 201, and so forth, such that a sequence of cards 202 is selected and used to generate a respective production-rendering for the collection. The selection of individual cards 202 for the renderings can be based on, for example, user input or interaction with one of the production-environment renderings, predefined logical connections amongst the cards 202 and/or other events. In this way, a sequence of cards 202 can be dynamically selected and used to generate production-environment renderings. In other implementations, a sequence of cards 202 are preselected for rendering by simulation rendering logic 220.

Incremental Loading Logic

The simulation engine 200 can implement incremental loading logic 210 to process each card 202 that is rendered through execution of the simulation rendering logic 220 in order to determine which cards of the prototype design to download. In some examples, the incremental loading logic 210 maintains and updates an incremental loading memory component 222, where the memory component's structure corresponds to a semantic structure determined through processing of individual cards 202. The semantic structure includes a nodal representation of the design elements of one or multiple cards 202 rendered by the simulation rendering logic 220, where each node of the semantic structure represents a production element of the simulated user interface or presentation.

In some aspects, cards 202 are displayed one at a time as part of the simulation, and the full prototype design may have hundreds of screens linked through interactions that the designer specifies in the underlying design. When memory, bandwidth, and processing speed are not constraints, the simulation engine 200 can load the entire collection 201 as fast as possible. In one example, in response to determining that memory storage capacity and/or processor power of the user computing device 10 is insufficient to load the entire collection 201 within a predetermined set of performance parameters, the incremental loading logic 210 can implement an incremental loading strategy.

To load as little as possible, the simulation engine 200 could load only the exact card 202 that the user is viewing. However, this would lead to user experience issues because when the user selects an interactive design element to change to another screen, the simulation rendering logic 220 would have to do another load. Instead, the incremental loading logic 210 balances load speed and also loading as few things as possible with the user experience. In some aspects, the incremental loading logic 210 utilizes a predictive element to load additional cards from the collection 201 that the user may choose to view next in addition to the current card 202 being viewed. In one aspect, the incremental loading logic 210 can traverse the document tree hierarchy viewed so far to determine which interactions the user is more likely to click on next. For example, the incremental loading logic 210 can determine a set of cards reachable through interactive design elements of the currently displayed card and then request content from that set of cards from the server.

In some aspects, the incremental loading logic 210 receives content from the server for the cards determined to be reachable through interactive design elements of the currently displayed card based on the document hierarchy for the collection 201. In examples, the server maintains the document hierarchy in a tree-like structure wherein the documents include pages, the pages include frames, frames can have groups, and groups can have further elements. Therefore, in order to display a page, the incremental loading logic 210 downloads content corresponding to that branch of the document tree.

In addition to the document tree for the collection 201, content that is part of the cards 202 can include reusable design elements such as components that are organized in separate document trees. Therefore, in addition to traversing the document tree for the collection 201, the incremental loading logic 210 traverses one or more separate component document trees for components that are embedded in each card 202 in order to download the necessary content to display each card 202.

Methodology

Figure 3A:
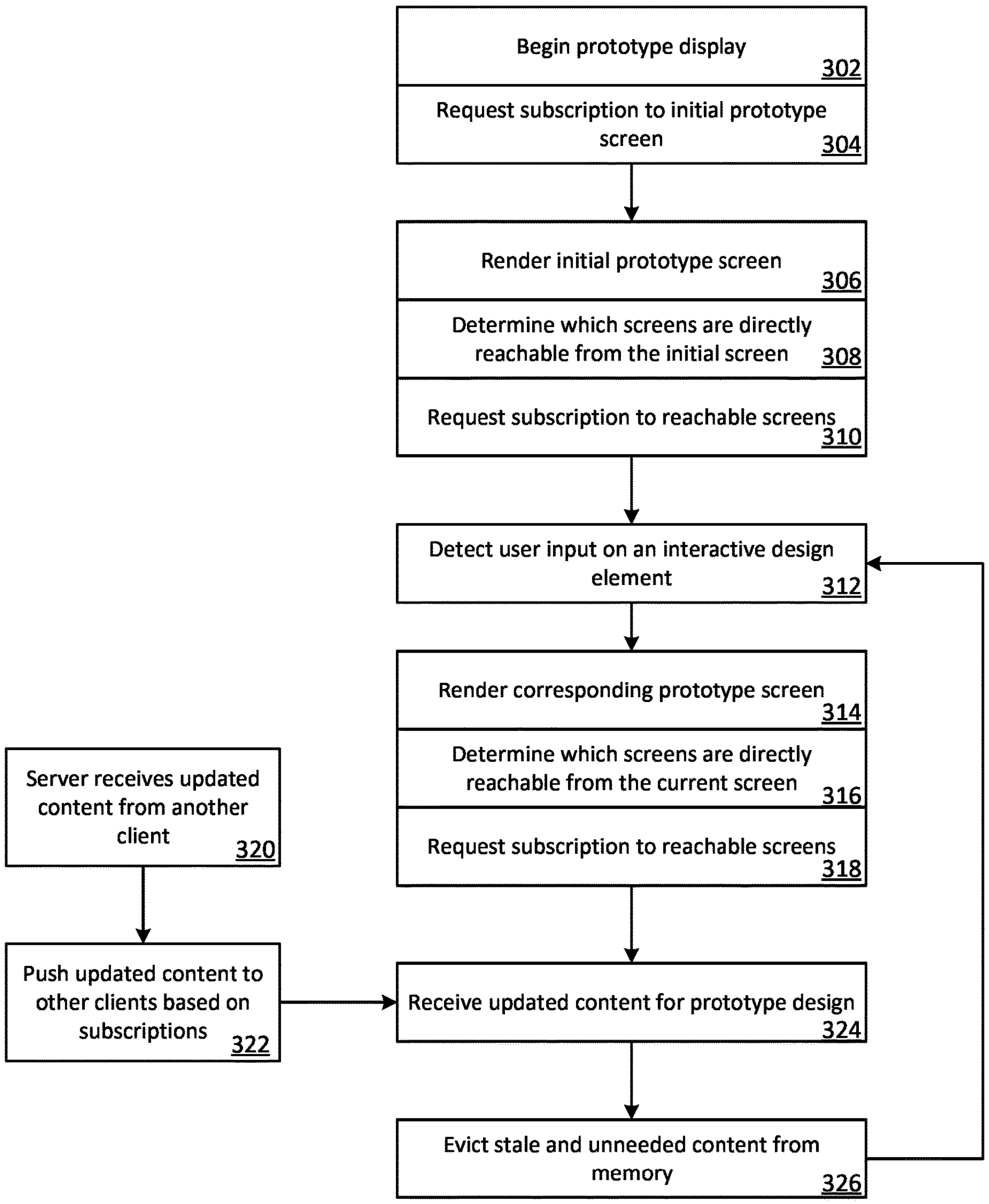
FIG. 3A illustrates an example method for implementing a simulation environment for a graphic design system, according to one or more embodiments.
Figure 3B:
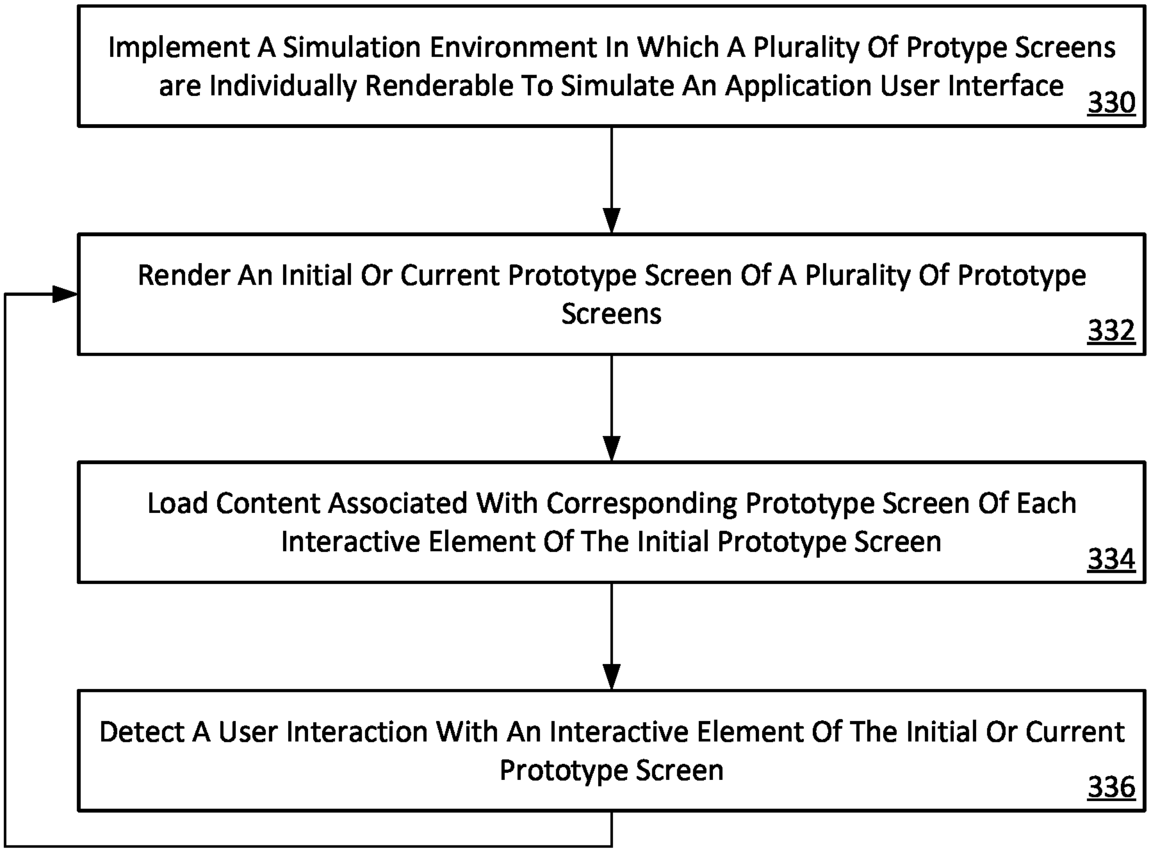
FIG. 3B illustrates another example method for implementing a simulation environment for a graphic design system, according to one or more embodiments.

FIG. 3A illustrates an example method for implementing a simulation environment as part of an interactive graphic design system, according to one or more embodiments. FIG. 3B illustrates another example method for implementing a simulation environment as part of an interactive graphic design system, according to one or more embodiments. In describing examples of FIG. 3A and FIG. 3B, reference is made to elements of prior examples, including FIG. 1A through FIG. 1C and FIG. 2, for purpose of illustrating functionality for implementing a step or sub-step being described.

With reference to FIG. 3A, at step 302, the IGDS 100 begins a prototype display in response to user input on the design interface 118 selecting the prototype feature. The IGDS 100 can initiate through the application80, beginning with an empty subscription.

At step 304, the incremental loading logic 210 requests a subscription to an initial prototype screen by sending a query message to the server specifying subtrees in the document tree by root ID. In one example, by default the initial prototype screen is a home screen or the first screen identified in the design. In other examples, the user can select any of the screens in the prototype to begin on as the initial prototype screen. The server responds with a reply message confirming the satisfied query and returns a snapshot of the subscription. After the initial response, the server will sync down any subsequent updates to the subscribed subset via additional changes messages.

At step 306, the rendering engine 120 renders the initial prototype screen from the content received from the server. The content includes one or more interactive design elements that the user can use to navigate to another screen in the prototype.

At step 308, the incremental loading logic 210 determines which screens are directly reachable from the initial screen. For example, interactive design elements on the initial screen that are linked parent-child to new screens indicate that those new screens are directly reachable. Besides parent-child links, documents can also contain generalized dependency edges. For example, component instances depend on a backing component (which they are live-updated copies of). The subscription implicitly includes these dependencies and any of their dependencies transitively. Dependency edges can also change as the document is edited: nodes can be reparented, and inter-document references like component variant properties or styles can change. When a client subscribes to a screen in a prototype, they are requesting "keep me updated to this node and all nodes which are and will ever be descendants or dependencies of it." When new dependencies are added which are not already included in a client's subscription, the server sends "node created" changes. When old dependencies are removed from a subscription, the server sends "node removed" changes.

At step 310, the incremental loading logic 210 requests subscriptions to reachable screens by sending another query message to the server specifying the corresponding subtrees in the document tree, thereby adding to the first subscription to the initial screen. The incremental loading logic 210 pauses subscribing to any further screens at this point. This reduces the total amount of memory required at any one time to display and navigate through the prototype. Loading the entire prototype in the background risks exceeding memory limits on mobile devices and crashing the application.

In addition to avoiding exceeding memory constraints, incremental loading also alleviates CPU lockup while processing newly loaded content in the middle of prototype navigation. Without incremental loading, many processes occur simultaneously as a user navigates from one screen to the next: the rendering engine 120 plays complex animations while the simulation engine 200 computes metadata about the new screen, preloads and processes yet more screens. All of this taking place at once can result in browsers locking up, animations and interactions not working smoothly, or even the application crashing.

In some aspects, each incremental load of the file is split into smaller chunks, which can be progressively loaded in the background more easily. Further local optimizations are also employed, such as skipping expensive computations of rendering metadata (e.g., layout, Boolean operations) when processing screens that are not yet being shown to the user.

At step 312, the design interface 118 detects user input on an interactive design element. At step 314, the rendering engine 120 renders the corresponding prototype screen based on the content associated with the document tree for that screen. At step 316, the incremental loading logic 210 determines which screens are directly reachable from the current screen. At step 318, the incremental loading logic 210 requests new subscriptions to screens that are reachable from the current screen as before.

At step 320, the server receives updated content for the prototype from another client of the interactive graphic design system. Unlike most other types of documents, files in the interactive graphic design system can be updated in real-time, with any changes immediately synced to all active views of the document (including prototypes). Thus, there can be many editors connected to a document, all collaborating and making changes to the document, and whenever a change is made, the server has to determine which clients should be notified of that change. This also enables designers to, for example, view a flow on its intended device while iterating on the underlying document on another. Therefore, the server determines which clients would be affected or have incrementally loaded content that is affected by any change received to the document. Thus, at step 322, the server pushes the updated content to other clients based on subscriptions.

At step 324, the user device receives the updated content for the prototype design. To improve performance, layouts for screens are already pre-computed when the client receives them from the server.

At step 326, the incremental loading logic 210 evicts stale and unneeded content to ease memory consumption. In order to minimize load times and memory usage, the incremental loading logic 210 subscribes to as few subscriptions as possible, therefore subscriptions to previously visited screens are removed by sending an unsubscribe message to the server. Since eviction is baked into the protocol, it suffices to change the subscription to the bare minimum needed to display a screen as the user navigates around in the prototype, and the application can evict and allocate as needed.

With reference to an example of FIG. 3B, in step 330, the IGDS 100 implements a simulation environment in which a plurality of prototype screens are individually renderable to simulate an application user interface. The simulation environment can be implemented in conjunction with one or multiple users collaborating on a graphic design. For example, the IGDS 100 can be implemented in alternative modes, including a design mode (e.g., where design users collaborate or otherwise provide input to update a graphic design for use with a production environment) and a simulation or prototype mode with the simulation environment is provided.

In step 332, when the simulation environment is implemented, an initial or current prototype screen of a plurality of prototype screens is rendered on a user terminal. The initial prototype screen can include a first set of interactive elements, where each interactive element is selectable in the simulation environment to navigate the simulation to a corresponding prototype screen. For example, the initial prototype screen can include a set of interactive buttons that each link to a corresponding prototype screen, reflecting, for example a different application screen or application state in a production environment.

In step 334, the IGDS 100 loads content associated with the corresponding prototype screen of each interactive element of the initial prototype screen. This process can include, for example, a breadthwise or first-level search where each link of the initial or rendered screen is identified, and the screen linked to that link is preloaded by the IGDS 100. Thus, each prototype screen that is directly linked to the currently rendered prototype screen is loaded. The content can be loaded into a resource that is ready to render for the user device 10, 12. For example, the content can be loaded onto a fast cache provided on the server and/or onto an application cache or memory on the corresponding user computer 10, 12. Accordingly, when the content is loaded, the content is retrieved from a first memory and made ready to render for the user during the simulation.

In some examples, step 334 is performed following a determination that the subscribing user device (where the simulation mode is being implemented) has insufficient memory, storage capacity and/or processing power to load the plurality of prototype screens in whole within a predetermined set of performance parameters. For example, the IGDS 100 (or an associated resource) can determine the subscribing user device has limited memory or bandwidth for loading the number of prototype screens in advance. In response to the determination, the IGDS 100 or associated resource can perform step 334, so as to selectively load prototype screens from the collection of prototyping screens. However, in some examples, the IGDS 100 can determine that the subscribing user device has sufficient resources to load the prototype screens of the collection in its entirety, in which case the IGDS 100 may ignore step 334.

In variations, the IGDS 100 can also implement a second-level search, by searching each linked screen to the current screen for directly linked screens. As another addition or variation, the IGDS 100 can select directly linked screens to load before other directly linked screens, thus limiting the number of prototype screens which are initially loaded to be less than the total number of prototype screens that are linked to the initial or currently displayed prototype screen.

In step 336, the IGDS 100 detects a user interaction with an interactive element of the initial or current prototype screen. In response, the IGDS performs step 332, with the porotype screen identified by the user selection being rendered as the current prototype screen. As described with other examples, the prototype screen that is rendered is preloaded. Then, following step 332, in step 334, the IGDS can load content associated with a corresponding prototype screen for each interactive element that is present on the current prototype screen.

Example Design Interface and Simulation

Figure 4A:
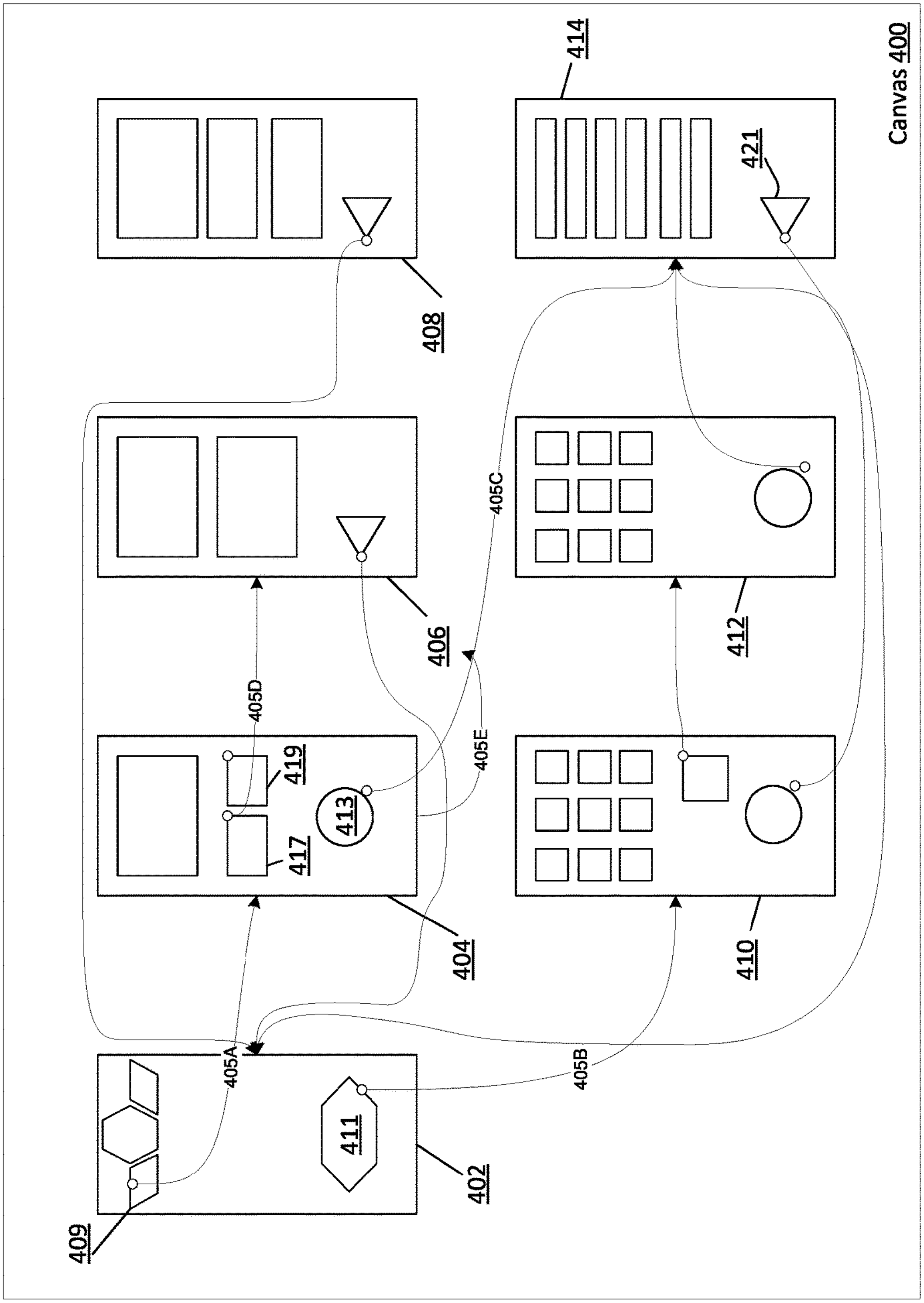
FIG. 4A illustrates a design interface on which a collection of cards representing user interface screens for a prototype simulation is provided, according to one or more embodiments.
Figure 4D:
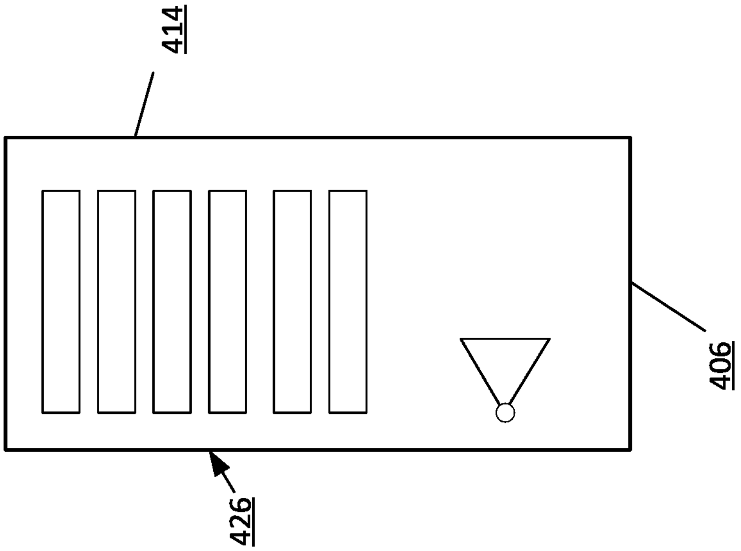
FIG. 4B through 4D illustrate a sequential rendering of the cards shown in FIG. 4A when rendered in a simulation environment, according to one or more embodiments.
Figure 4C:
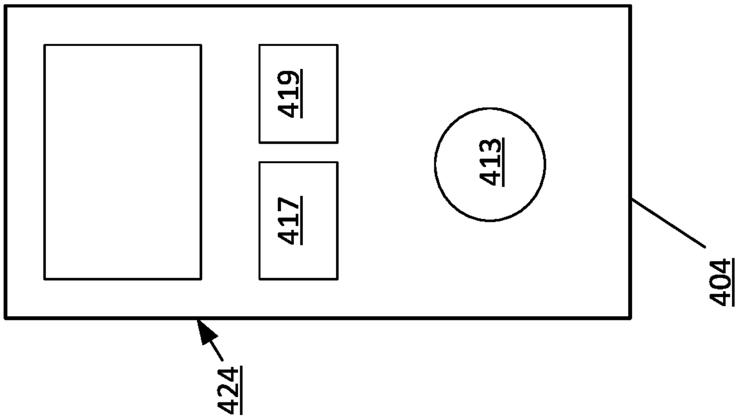
Figure 4B:
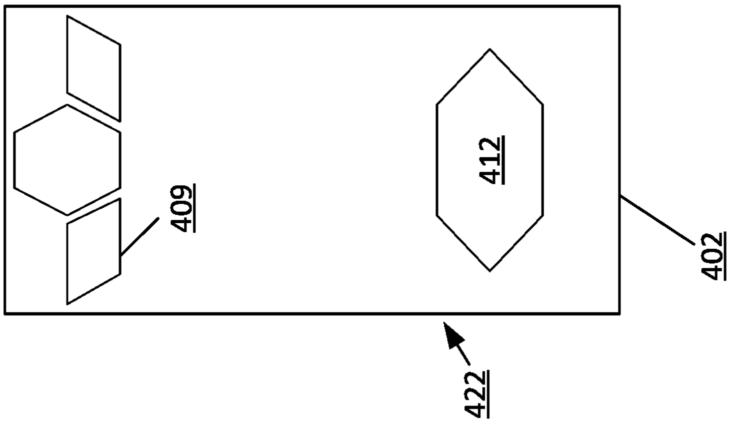

FIG. 4A illustrates a design interface on which a collection of cards representing user interface screens for a prototype simulation is provided, according to one or more embodiments. FIG. 4B through FIG. 4D illustrate a sequential rendering of the cards in a simulation environment, according to one or more examples. As described with examples, the design interface 400 can be generated by the IGDS 100 when implemented in a design mode. The rendering of the cards (e.g., prototypes) can be generated by the IGDS when implemented in a simulation mode.

With reference to FIG. 4A, the canvas 400 contains a graphic design created by one or more collaborators. The graphic design includes a combination of design elements, arranged in individual cards 402-414. The document or design file for the graphic design can, for example, include a hierarchical structure of nodes that represent the design elements, with each card being defined by a top-level node, and design elements that appear on the card being sub-nodes thereof. Each card 402-414 can define a state of a functional user interface in a production-environment. Accordingly, each card 402-414 can represent a screen (e.g., display window or panel) on an end user device where the functional user interface is provided. On the design level, a user can define a flow or sequence between cards, representing a functional flow for the user-interface in the production environment. In an example shown, a user can define the flow between cards using, for example, line connectors 405. In variations, a user can define the flow between cards using other types of data structures (e.g., tables for components, etc.).

In examples, a user can select to implement the IGDS in simulation mode in order to view and evaluate individual cards and flows from the perspective of a production environment. When the IGDS 100 is implemented in design mode, the user(s) can edit, update and otherwise create cards 402-414 to reflect the various states and aspects of an application user interface. When the IGDS 100 is implemented in simulation mode, each card 402-414 is individually renderable in interactive form to simulate the production-environment for the graphic design in its then-current state. In the simulation mode, each user can interact with the individual cards 402-414 by selecting, for example, an interactive design element and viewing a linked or connected card to that interactive element. The determination of which card is linked or connected can be based on the presence of a connector 405 or other data structure that defines the connected card(s) for the selected interactive element.

To illustrate by example, FIG. 4B through FIG. 4D illustrate a sequence during the simulation mode when the user is provided an initial display screen 422 includes content of the card 402 (FIG. 4A), followed by a display screen 424 that includes content of the card 404 (FIG. 4B), and the display screen 426 that includes content of the card 414 (FIG. 4D). In the example provided, the card 402 can be selected for the initial or start screen 422 based on, for example, a setting, designation, user input (e.g., which card is pre-selected in design mode), which card the user viewed the last time the simulation mode was run, etc. The card 404 may be selected for the next screen 424 based on a user interaction (during the simulation mode) with the interactive element 411. The card 414 may be selected for the next screen 426 based on the user interaction with the element 413. In this way, the display screens 422, 424, 426 appear in a sequence, with the display screens 424, 426 appearing in response to user interaction.

To implement the simulation mode, the IGDS 100 can load (or preload) individual cards 402-414 of the collection when the simulation mode is selected. If the resources (e.g., processing resources, memory resources, bandwidth, etc.) required for simulation mode are not of consequence, then the IGDS 100 may preload all of the cards 402-414, including data that defines the flow and interaction between the individual cards 402-414. However, with the increasing complexity of graphic designs and functional interfaces, the number of cards in a given collection can number in the tens or hundreds. Further, the types of user devices that may be used can vary and can include devices with more limited resources (e.g., mobile devices). Further, the number of collaborators on one graphic design can include numerous individuals, requiring significant resources to maintain a synchronized set of design elements. Accordingly, loading all of the cards 402-414 in the collection for simulation mode can result in degradation of the simulation mode and/or performance of the IGDS 100, such as through long pauses and slow rendering of individual cards when rendered in the simulation mode.

In examples, the IGDS 100 selectively preloads cards of the collection. The determination of which cards 402-414 to load can be based on a determination of which card the simulation mode will render next. For example, as shown with FIG. 4B, in response to the user selecting simulation mode, the IGDS 100 identifies an initial or starting screen 422, showing the card 402. The card 402 can include multiple interactive elements 409, 411, linking (based on respective connectors 405 or data defined in the design mode) to cards 404, 410, respectively. For the simulation mode, the IGDS 100 identifies cards 404 and 410 as being directly linked or referenced by the respective interactive elements 409, 411 appearing on the card 402. Accordingly, in examples, the IGDS 100 loads cards 402, 404, and 410 at the same time, with the card 402 being displayed initially in the simulation mode. Alternatively, the card 402 can be rendered in the simulation mode, with the cards 404 and 410 being loaded concurrently with the rendering of the card 402 and/or before any user interaction is received. Further, in examples, other cards 406, 408, 412, 414 may not be loaded while content from the card 402 is being rendered in the simulation mode.

In the example provided, the user interacts with the element 409 while the display screen 422 is rendered in the simulation mode, to cause the IGDS 100 to render display screen 424, using content of card 404. As the card 404 was preloaded, display screen 424 can be rendered with minimal latency (e.g., instantly or near-instantaneously after the input is received). Further, at the same time or concurrently with the display screen 424 being rendered, the IGDS 100 scans the card 404 to identify the interactive elements 413, 417, 419 of the card. As described with other examples, the interactive element 413, 417, 419 can include design elements which are associated with a corresponding connector 405C, 405D, 405E (or connector data) and/or another card 402-414 of the collection. In response to the user interaction, the IGDS 100 loads the cards 406, 408 and 414, which are linked by respective connectors 405C, 405D, 405E (or other connector data) in the design mode). Other cards in the collection are not loaded.

Next, in the example provided, the user interacts with the element 413 while the display screen 424 is rendered, to cause the IGDS 100 to render the display screen 426, using content of card 414. As the card 414 was preloaded with display screen 422, the rendering of the display screen 424 may be instantaneous, or nearly instantaneous. At the same time or concurrently with the display screen 426 being rendered, the IGDS 100 scans the card 414 to identify the interactive elements 421, which links back to the card 402. In some examples, the IGDS 100 may have evicted the card 402 from the memory where the cards are preloaded shortly after the simulation navigates to a next card (e.g., card 404) or following card (e.g., 414). In such case, the card 402 may be preloaded, and in the event the user interacts with the element 421, the display screen 422 is rendered based on the content of the card 402.

While some examples provide for the IGDS 100 to load linked cards (or directly connected cards, resulting from a first level search) to the card that is loaded at a particular time, in variations, other selection criteria can be used to determine which cards to preload. In some examples, the IGDS 100 does a first and second level search of connected cards for each card that is used in the simulation mode. The second level search can identify cards that are linked to directly connected cards (identified through first-level search). Thus, with reference to FIG. 4A, the loaded cards can include those identified by a first-level search or connection (e.g., cards 404, 414), and those identified by a second-level search (e.g., cards 406, 408 and 414 connected to card 404, and no additional cards from card 414). In variations, a priority schema is used to determine which cards to preload, such as those cards which were most recently or commonly used by users who collaborate on the graphic design.

Network Computer System

Figure 5:
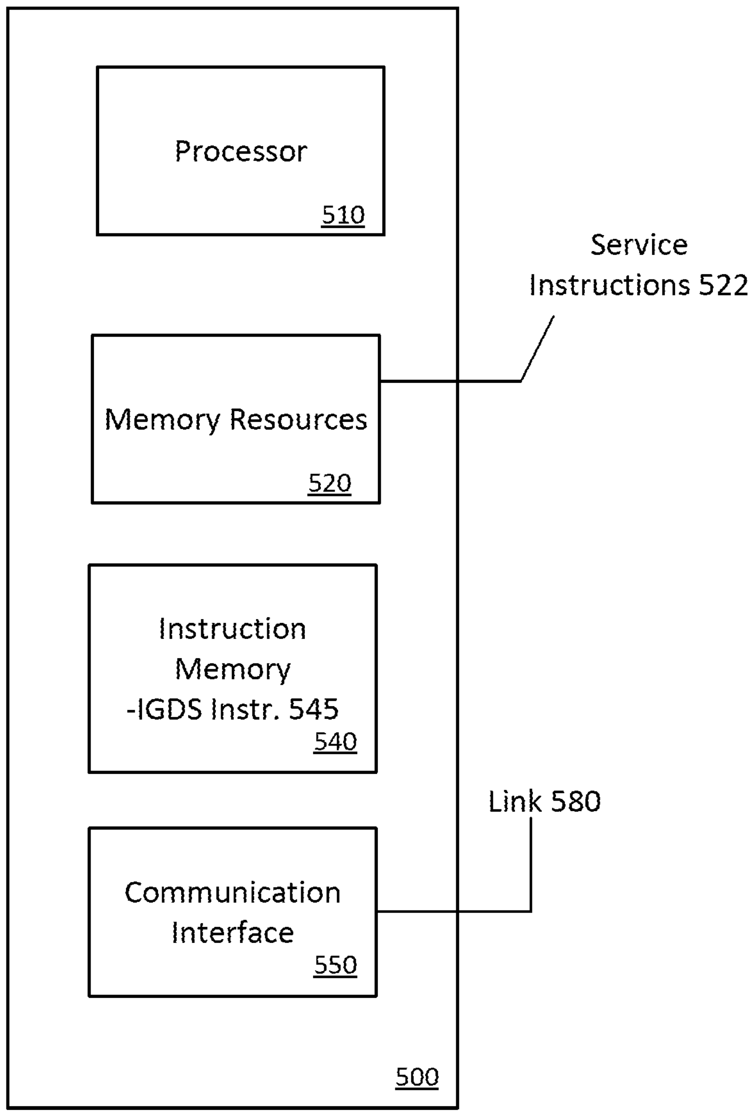
FIG. 5 illustrates a network computer system on which one or more embodiments can be implemented.

FIG. 5 illustrates a computer system on which one or more embodiments can be implemented. A computer system 500 can be implemented on, for example, a server or combination of servers. For example, the computer system 500 may be implemented as the network computing system 150 of FIG. 1A through FIG. 1C.

In one implementation, the computer system 500 includes processing resources 510, memory resources 520 (e.g., read-only memory (ROM) or random-access memory (RAM)), one or more instruction memory resources 540, and a communication interface 550. The computer system 500 includes at least one processor 510 for processing information stored with the memory resources 520, such as provided by a random-access memory (RAM) or other dynamic storage device, for storing information and instructions which are executable by the processor 510. The memory resources 520 may also be used to store temporary variables or other intermediate information during execution of instructions to be executed by the processor 510.

The communication interface 550 enables the computer system 500 to communicate with one or more user computing devices, over one or more networks (e.g., cellular network) through use of the network link 580 (wireless or a wire). Using the network link 580, the computer system 500 can communicate with one or more computing devices, specialized devices and modules, and/or one or more servers.

In examples, the processor 510 may execute service instructions 522, stored with the memory resources 520, in order to enable the network computing system to implement the network service 172 and operate as the network computing system 170 in examples such as described with FIG. 1A through FIG. 1C.

The computer system 500 may also include additional memory resources ("instruction memory 540") for storing executable instruction sets ("IGDS instructions 545") which are embedded with webpages and other web resources, to enable user computing devices to implement functionality such as described with the IGDS 100.

As such, examples described herein are related to the use of the computer system 500 for implementing the techniques described herein. According to an aspect, techniques are performed by the computer system 500 in response to the processor 510 executing one or more sequences of one or more instructions contained in the memory 520. Such instructions may be read into the memory 520 from another machine-readable medium. Execution of the sequences of instructions contained in the memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

User Computing Device

Figure 6:
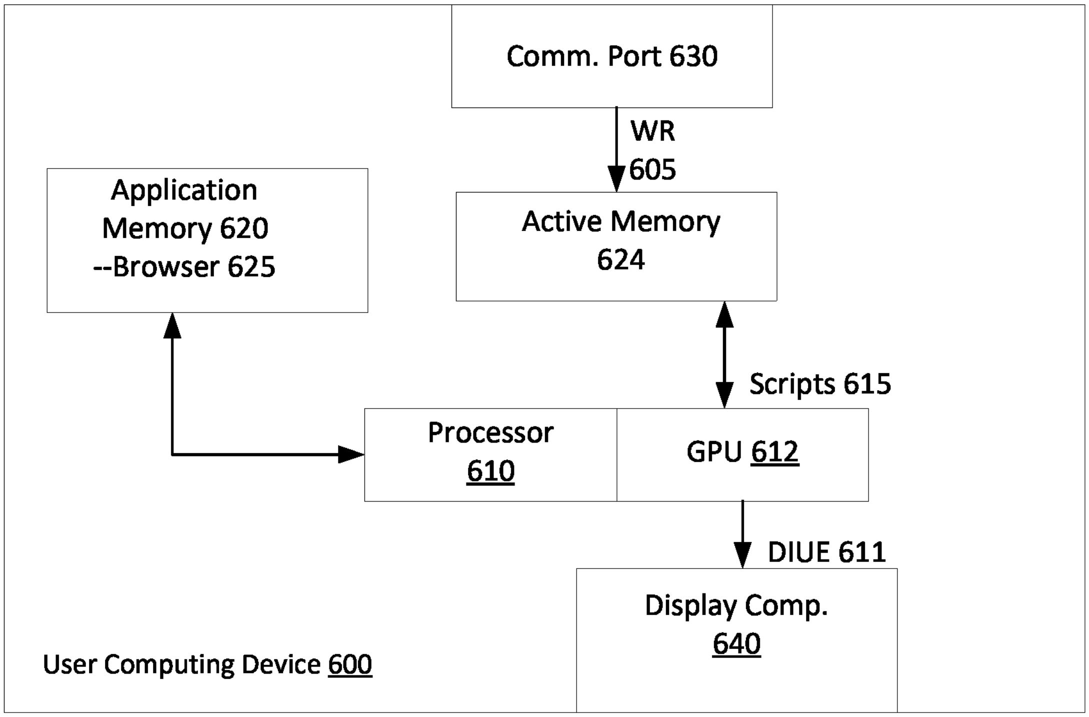
FIG. 6 illustrates a user computing device for use with one or more examples, as described.

FIG. 6 illustrates a user computing device for use with one or more examples, as described. In examples, a user computing device 600 can correspond to, for example, a workstation, a desktop computer, a laptop or other computer system having graphics processing capabilities that are suitable for enabling renderings of design interfaces and graphic design work. In variations, the user computing device 600 can correspond to a mobile computing device, such as a smartphone, tablet computer, laptop computer, VR or AR headset device, and the like.

In examples, the computing device 600 includes a central or main processor 610, a graphics processing unit 612, memory resources 620, and one or more communication ports 630. The computing device 600 can use the main processor 610 and the memory resources 620 to store and launch a browser 625 or other web-based application. A user can operate the browser 625 to access a network site of the network service 152, using the communication port 630, where one or more web pages or other resources 605 for the network service 152 (see FIG. 1A through FIG. 1C) can be downloaded. The web resources 605 can be stored in the active memory 624 (cache).

As described by various examples, the processor 610 can detect and execute scripts and other logic which are embedded in the web resource in order to implement the IGDS 100 (see FIG. 1A through FIG. 1C). In some of the examples, some of the scripts 615 which are embedded with the web resources 605 can include GPU accelerated logic that is executed directly by the GPU 612. The main processor 610 and the GPU can combine to render a design interface under edit ("DIUE 611") on a display component 640. The rendered design interface can include web content from the browser 625, as well as design interface content and functional elements generated by scripts and other logic embedded with the web resource 605. By including scripts 615 that are directly executable on the GPU 612, the logic embedded with the web resource 615 can better execute the IGDS 100, as described with various examples.

Conclusion

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

st set of prototype screens.

What is claimed is:

1. A computer system comprising:

a memory resource storing instructions; and one or more processors using the instructions stored in the memory resource to perform operations including:

implementing a simulation environment in which a plurality of prototype screens are individually renderable to simulate an application user interface;

displaying an initial prototype screen of the plurality of prototype screens, the initial prototype screen including a first set of interactive elements associated with connector data in a graphic design file that specifies transitions from the first set of interactive elements to corresponding subsequent prototype screens;

determining, based on the graphic design file, the corresponding first set of subsequent prototype screens that are directly reachable from the initial prototype screen in the simulation environment; and based on the corresponding first set of subsequent prototype screens, loading content associated with each prototype screen of the corresponding first set of subsequent prototype screens, wherein the loading is limited to the corresponding first set of subsequent prototype screens.

2. The computer system of claim 1, the operations further including:

receiving user input corresponding to a selection of an interactive element of the first set of interactive elements;

based on the selection of the interactive element, displaying a second prototype screen of the plurality of prototype screens, the second prototype screen including a second set of interactive elements to navigate to a corresponding second set of prototype screens; and loading content associated with each prototype screen of the second set of prototype screens.

3. The computer system of claim 2, the operations further including: evicting content associated with the initial prototype screen from memory.

4. The computer system of claim 1, wherein loading the content associated with each prototype screen of the first set of prototype screens includes traversing a document tree for the plurality of prototype screens.

5. The computer system of claim 4, wherein loading the content associated with each prototype screen of the first set of prototype screens includes traversing one or more separate component document trees for components that are embedded in each prototype screen.

6. The computer system of claim 1, the operations further including:

updating the content associated with one or more of the first set of prototype screens based on changes made by another user of the simulation environment.

7. The computer system of claim 1, wherein the computer system loads the content associated with each prototype screen of the first set of prototype screens in response to determining that memory storage capacity and/or processor power is determined to be insufficient to load the plurality of prototype screens in whole within a predetermined set of performance parameters.

8. The computer system of claim 1, further comprising:

maintaining content associated with one or more additional prototype screens of the corresponding first set of subsequent prototype screens in a loaded state that is queued for rendering, without displaying the additional prototype screens, wherein the additional prototype screens are available for rendering in response to subsequent navigation.

9. A method of incremental loading, the method being implemented by one or more processors and comprising:

implementing a simulation environment in which a plurality of prototype screens are individually renderable to simulate an application user interface;

displaying an initial prototype screen of the plurality of prototype screens, the initial prototype screen including a first set of interactive elements associated with connector data in a graphic design file that specifies transitions from the first set of interactive elements to corresponding subsequent prototype screens;

determining, based on the graphic design file, the corresponding first set of subsequent prototype screens that are directly reachable from the initial prototype screen in the simulation environment; and based on the corresponding first set of subsequent prototype screens, loading content associated with each prototype screen of the first set of subsequent prototype screens, wherein the loading is limited to the corresponding first set of subsequent prototype screens.

10. The method of claim 9, further comprising:

receiving user input corresponding to a selection of an interactive element of the first set of interactive elements;

based on the selection of the interactive element, displaying a second prototype screen of the plurality of prototype screens, the second prototype screen including a second set of interactive elements to navigate to a corresponding second set of prototype screens; and loading content associated with each prototype screen of the second set of prototype screens.

11. The method of claim 10, further comprising:

evicting content associated with the initial prototype screen from memory.

12. The method of claim 9, wherein loading the content associated with each prototype screen of the first set of prototype screens includes traversing a document tree for the plurality of prototype screens.

13. The method of claim 12, wherein loading the content associated with each prototype screen of the first set of prototype screens includes traversing one or more separate component document trees for components that are embedded in each prototype screen.

14. The method of claim 9, further comprising:

updating the content associated with one or more of the first set of prototype screens based on changes made by another user of the simulation environment.

15. The method of claim 9, wherein loading content associated with each prototype screen of a second set of prototype screens is performed in response to determining that memory storage capacity and/or processor power is determined to be insufficient to load the plurality of prototype screens in whole within a predetermined set of performance parameters.

16. A non-transitory computer-readable medium that stores instructions, executable by one or more processors, to cause the one or more processors to perform operations including:

implementing a simulation environment in which a plurality of prototype screens are individually renderable to simulate an application user interface;

displaying an initial prototype screen of the plurality of prototype screens, the initial prototype screen including a first set of interactive elements associated with connector data in a graphic design file that specifies transitions from the first set of interactive elements to corresponding subsequent prototype screens;

determining, based on the graphic design file, the corresponding first set of subsequent prototype screens that are directly reachable from the initial prototype screen in the simulation environment; and based on the corresponding first set of subsequent prototype screens, selectively loading content associated with each prototype screen of the first set of subsequent prototype screens, wherein the loading is limited to the corresponding first set of subsequent prototype screens.

17. The non-transitory computer-readable medium of claim 16, wherein the operations further comprise:

receiving user input corresponding to a selection of an interactive element of the first set of interactive elements;

based on the selection of the interactive element, displaying a second prototype screen of the plurality of prototype screens, the second prototype screen including a second set of interactive elements to navigate to a corresponding second set of prototype screens; and loading content associated with each prototype screen of the second set of prototype screens.

18. The non-transitory computer-readable medium of claim 17, wherein the operations further comprise:

evicting content associated with the initial prototype screen from memory.

19. The non-transitory computer-readable medium of claim 16, wherein loading the content associated with each prototype screen of the first set of prototype screens includes traversing a document tree for the plurality of prototype screens.

20. The non-transitory computer-readable medium of claim 19, wherein loading the content associated with each prototype screen of the first set of prototype screens includes traversing one or more separate component document trees for components that are embedded in each prototype screen.

* * * * *